United States Patent [19]

Beck, Jr.

[11] 3,734,637
[45] May 22, 1973

[54] CENTRIFUGAL PUMP

[75] Inventor: Richard Beck, Jr., Denver, Colo.

[73] Assignee: Sundstrand Corporation, Rockford, Ill.

[22] Filed: May 13, 1971

[21] Appl. No.: 143,138

[52] U.S. Cl.............415/122 R, 184/6.28, 417/423
[51] Int. Cl. .....................F01d 15/12, F01m 11/00
[58] Field of Search .....................415/122; 184/6.26, 184/6.28; 417/423

[56] References Cited

UNITED STATES PATENTS

| | | | |
|---|---|---|---|
| 2,615,533 | 10/1952 | Cliborn | 415/122 |
| 2,695,131 | 11/1954 | Price | 415/122 |
| 3,444,959 | 5/1969 | Mansfield et al. | 415/122 |

*Primary Examiner*—Henry F. Raduazo
*Attorney*—Hofgren, Wegner, Allen, Stellman & McCord

[57] ABSTRACT

A speed increaser for a high speed centrifugal pump including a gearbox with a motor driven large gear therein drivingly interengaging a small pinion formed on a pump impeller rotating shaft. The gearbox is divided by a shroud adjacent the gears defining an oil reservoir on one side and a gear cavity on the other. A bleed orifice is provided in the shroud for bleeding oil into the gear cavity at a rate sufficient to maintain oil at a skimming level with respect to the large gear so that the large gear splashes oil in the gear cavity into a mist for lubricating the gears in various bearings within the gearbox.

10 Claims, 2 Drawing Figures

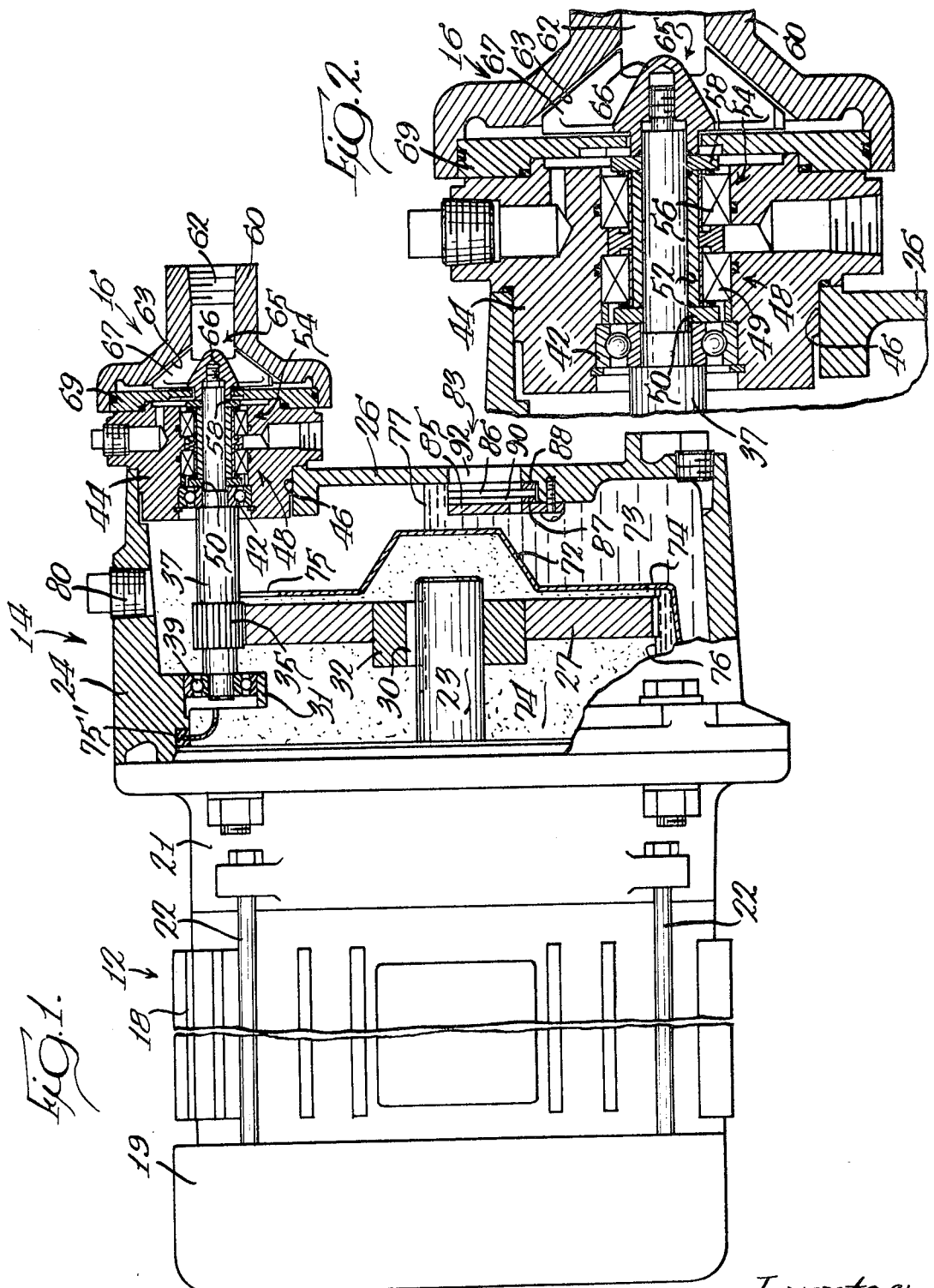

CENTRIFUGAL PUMP

BACKGROUND OF THE PRESENT INVENTION

Centrifugal pumps designed for low specific speed applications, i.e. high head-low flow, require a high impeller speed to obtain reasonable efficiencies. Since two pole induction motors conventionally employed for driving pumps of this type rotate at 3,000 or 3,600 rpm, a speed increasing device is required to obtain the necessary high impeller speeds. Because of the high rotational speeds required in a speed increasing gearbox having parts rotating as high as 40,000 rpm, a rather complicated lubrication system has been found to be required in the past. Such systems include lubrication delivery passages, a lubrication pump and a lubricating oil cooling device to maintain the proper temperature of the lubricating oil.

Thus these prior art gearboxes and lubricating systems therefor have been rather complicated, inefficient and costly.

It is a primary object of the present invention to minimize the problems in prior art speed increasing devices for high speed centrifugal pumps.

SUMMARY OF THE PRESENT INVENTION

In accordance with the present invention an efficient, simple and low cost speed increaser is provided for a high speed centrifugal pump. The speed increaser includes a gearbox having a large gear driven by a two pole induction motor and a small pinion driven thereby and connected to rotate the impeller on the centrifugal pump. The gearbox cavity is divided by a shroud that defines an oil reservoir adjacent the cover plate of the gearbox and a gear cavity.

The oil level in the gear cavity is low under dynamic conditions, just sufficient to be skimmed by the teeth on the larger gear so that the gear splashes the oil into a mist that lubricates the gears as well as the bearings which support the pinion carrying shaft. The low oil level within the gear cavity reduces the power loss in the gearbox to the extent that no gearbox oil cooler is required even though the pinion shaft may rotate up to 40,000 rpm.

To maintain this oil skimming level within the gear cavity, an orifice is provided in the shroud adjacent the lower portion of the large gear so that oil may bleed from the reservoir into the gear cavity under dynamic conditions.

Upon start-up the level of oil in the gear cavity is above the skimming level and more oil is thrown from the gear cavity into the reservoir than flows from the reservoir into the gear cavity through the orifice. The orifice is sized such that an equilibrium is reached when the oil level in the gear cavity is at the skimming level described above with respect to the large gear. The result of this is that the dynamic oil level in the reservoir is much higher than the hynamic oil level in the gear cavity.

This arrangement greatly reduces the heat generation in the gearbox and also avoids excessive oil from being trapped between the gear teeth. Excessive oil trapped between the gear teeth results in gear teeth distress. The same problem occurs in the bearings when excessive oil is trapped therein.

BRIEF DESCRIPTION OF THE DRAWINGS

FIG. 1 illustrates a high speed, low specific speed, centrifugal pump assembly illustrated partly in section, and detailed description of the preferred embodiment.

FIG. 2 is an enlarged fragmentary section of the centrifugal pump and seal.

Referring to the drawings a centrifugal pump assembly 10 is illustrated according to the present invention consisting generally of a two or four pole induction motor 12 driving a speed increasing gearbox 14 which, in turn, rotates the impeller of a high speed centrifugal pump 16. The pump 16 is a high speed, low flow centrifugal pump operating at speeds from 5 to 40,000 rpm. The high speed low flow characteristic produces a pump having a high head characteristic.

The motor 12 is a two or four pole induction motor having a central housing member 18, an end housing member 19 and an output flange member 21 connected to the housing member 19 be tie rods 22. Motor 12 has an output shaft 23 extending into gearbox 14. Shaft 23 rotates at 3,000 3,600 1,500 or 1,800 rpm when the motor is supplied with 50 or 60 Hz. power. The gearbox 14 has generally an annular housing member 24 enclosed by having an integral end plate 26.

The motor shaft 23 drives a large gear 27. Shaft 23 is keyed by a roll pin 30 to a bushing 32 carrying the large gear 27. Gear 27 interengages a small pinion 35 formed integrally with pump drive shaft 37. Shaft 37 is supported at its left end in a bearing 39 carried by an inwardly projecting boss from gearbox housing 24.

The right end of the shaft 37 is supported in a bearing 42 mounted in seal housing 44. Seal housing 44 is fixed within a circular aperture 46 in the upper portion of cover plate 26.

The seal housing 44 includes a gearbox seal 48 having a stationary member 49 slidably engaging a rotating ring 50 fixed to a reduced portion 52 of shaft 37. Also provided in the seal housing 44 is a pump seal 54 including a stationary member 56 slidably engaging a rotary ring 58 fixed to the reduced shaft portion 52.

The high speed-high head centrifugal pump 16 includes a pump housing 60 having a central inlet 62, a conical impeller chamber 63 and a tangentially disposed outlet (not shown). Threadedly fixed to shaft portion 52 and rotatable in the impeller chamber 63 is impeller 65 including a nose piece 66 and generally radially disposed blades 67.

Housing member 60 is carried by a backplate 69 fixed to the seal housing 44.

As noted above, there is provided according to the present invention an efficient, simple and low cost lubrication system for the gearbox 14 that eliminates the necessity for lubrication pumps, heat exchangers, and also reduces the power losses in the gearbox itself.

Toward this end a generally cup-shaped shroud or barrier 72 is provided within the gearbox cavity, dividing the gearbox cavity into an oil reservoir 73 and a gear cavity 74. The shroud 72 extends completely across the gearbox cavity and is sealed to the gearbox by an annular seal ring 75. Shroud 72 has a cutout portion 75 permitting the shaft 37, bearing 39 and boss 41 to project partly therethrough. The opening or aperture 75 also permits lubricating oil to pass from the gear chamber 74 into the reservoir 73.

As shown in the drawing, the oil levels 76 and 77 in the gear cavity 74 and the reservoir 73 are at their dynamic levels. The level of oil in the gear cavity 74 is low, preferably only just above the lowermost teeth, but sufficient so that the large gear 27 splashes the oil in the gear cavity into a mist for lubricating the gears 27, 35 as well as the bearings 39 and 42. It is an important feature of the present invention that the level 76 of oil in the gear cavities be sufficiently low so that the gear 27 does not dip into the oil merely skims it.

To replenish oil in the gear cavity 74 as the gear 27 rotates producing an oil mist in gear chamber 74 as well as the upper part of the reservoir 73 adjacent bearing 42, an orifice 77 is provided in the shroud 72 adjacent the lower part of the large gear 27. The orifice 77 is sufficiently small so that it will bleed fluid at a rate to maintain the skimming oil level 76 in the gear chamber 74 under equilibrium conditions, after a transient start-up period.

On start-up, the oil level in the gear chamber 74 is higher than the level shown in the drawing which represents the dynamic level. This results in a considerable amount of oil being thrown by large gear 27 from the gear cavity 74 through opening 75 into the reservoir 73. This reduces the oil level in cavity 74, increases the oil level in reservoir 77 until an equilibrium condition is established with bleed flow through orifice 77 maintaining the desired oil level 76 under dynamic steady state conditions.

The oil mist produced by gear 27 lubricates bearing 29, as well as the gears, and passes through opening 75 lubricating the right bearing 42 for the pinion shaft 37.

The reservoir 73 is initially filled by an upper fill plug 80, and drained by lower drain plug 81.

A sight glass assembly 83 is provided for observing both the static and dynamic oil levels within the reservoir 73. Toward this end a retaining member 85 holds a sight glass 86 between gaskets 87 and 88 defining a level chamber 90 through which the oil level may be viewed through opening 92 in the housing end plate 26.

I claim:

1. A rotary pump assembly, comprising; a rotary pump, drive means for said rotary pump including a gearbox, first and second speed increasing horizontal intermeshing gears in said gearbox, a vertically disposed shroud in said gearbox defining a sealed lubrication reservoir and a gear chamber within the gearbox, and means for bleeding fluid from the reservoir into the gear chamber for lubricating the gears by maintaining a predetermined fluid level in said gear chamber.

2. A rotary pump assembly as defined in claim 1, wherein said means for bleeding fluid is a bleed orifice in said shroud.

3. A rotary pump assembly as defined in claim 2, wherein said bleed orifice is sufficiently small to bleed fluid into the gear chamber to maintain a gear teeth skimming level at one of said gears.

4. A rotary pump assembly as defined in claim 1, said intermeshing gears being a speed increaser for said pump and including a lower large gear and an intermeshing upper pinion gear, shaft means supporting said pinion and driving said pump, bearing means supporting said shaft means, said bleed means bleeding a sufficient amount of fluid from said reservoir to said gear chamber to maintain a level in the gear chamber so that the large gear skims oil into a mist for lubrication.

5. A rotary pump assembly as defined in claim 1, said bleeding means being sufficient to provide an oil level in the gear chamber so that one of the gears splashes oil into a mist, said shroud having an opening therethrough permitting the egress of oil from the gear chamber to said reservoir, said bleed means being sufficiently large to maintain an equilibrium between the egress of oil from the gear chamber and the bleeding of oil into the chamber.

6. A rotary pump assembly, comprising; motor means having a drive shaft, a gearbox into which said drive shaft extends, speed increasing horizontal gears including a large gear connected to said motor drive shaft, an intermeshing small pinion gear above the large gear in the gearbox, pinion shaft means carrying said pinion, a bearing at each end of the pinion shaft means, a rotary pump, said pinion shaft means being drivingly connected to said pump, said gearbox having a vertical shroud thereon dividing the gearbox into a sealed oil reservoir and a gear chamber in which the large gear is located, an opening in said shroud adjacent the upper portion thereof permitting the egress of oil from the gear chamber, bleed means in said shroud for maintaining an oil level in the gear chamber, said bleed means being sufficient to maintain and oil skimming level adjacent the large gear to produce a lubrication mist.

7. A rotary pump assembly as defined in claim 6, wherein said opening in the shroud is around one of said bearings and the gears approximately at their point of engagement.

8. A rotary pump assembly as defined in claim 7, wherein said opening permits oil mist to lubricate the other bearing supporting said pinion shaft means.

9. A rotary pump assembly as defined in claim 6, wherein said bleed means includes an orifice in said shroud means adjacent the lower portion of the large gear and below the static and dynamic oil levels in the reservoir.

10. A rotary pump assembly, comprising; a motor, a motor shaft extending from said motor, a gearbox housing, said motor shaft projecting into said gearbox housing, speed increasing gearing horizontally disposed including a large gear fixed to said motor shaft, a pinion gear interengaging said large gear, a pinion shaft carrying said pinion, spaced bearings supporting said pinion shaft, a rotary pump fixed to said gearbox, a lubrication system for the gears and the bearings including a generally vertical cup-shaped shroud in said gearbox dividing the same into a sealed reservoir and a gear chamber, said shroud having an opening therethrough in the upper portion thereof to permit the pinion shaft to pass at least partly therethrough, a bleed opening in said shroud adjacent the lower portion of the large gear permitting oil to bleed from the reservoir into the chamber at a rate under dynamic conditions sufficient to maintain an oil skimming level in the gear chamber adjacent the large gear so that the large gear skims oil into a mist, said opening in the shroud being positioned to permit oil to pass from the gear chamber to the reservoir, the dynamic oil level in the reservoir being substantially higher than the dynamic oil level in the gear chamber, said bleed orifice being substantially below the oil level in the reservoir.

* * * * *